US006740385B2

(12) United States Patent
Gardner et al.

(10) Patent No.: US 6,740,385 B2
(45) Date of Patent: May 25, 2004

(54) TUFTABLE AND TUFTED FABRICS

(75) Inventors: Hugh Chester Gardner, Roswell, GA (US); Thomas Lee Baker, Winston, GA (US); Stephen G. Ceisel, Marietta, GA (US); Richard C. Moon, Dalton, GA (US); Thomas L. Oakley, Marietta, GA (US); Mark B. Williams, Dalton, GA (US)

(73) Assignee: BP Corporation North America Inc., Warrenville, IL (US)

( * ) Notice: Subject to any disclaimer, the term of this patent is extended or adjusted under 35 U.S.C. 154(b) by 61 days.

(21) Appl. No.: 09/820,237

(22) Filed: Mar. 28, 2001

(65) Prior Publication Data
US 2002/0172795 A1 Nov. 21, 2002

(51) Int. Cl.$^7$ .............................................. B32B 33/00
(52) U.S. Cl. .......................... 428/85; 428/95; 442/186; 442/270; 442/402; 28/107; 28/109; 28/15
(58) Field of Search .......................... 28/107, 109, 159; 428/85, 95; 442/186, 270, 402

(56) References Cited

U.S. PATENT DOCUMENTS

| | | | |
|---|---|---|---|
| 3,605,666 A | 9/1971 | Kimmel et al. | 112/410 |
| 3,817,817 A | 6/1974 | Pickens et al. | 161/67 |
| 3,819,462 A | 6/1974 | Starr et al. | 161/62 |
| 3,867,243 A | 2/1975 | Stoller | 161/65 |
| 3,955,022 A | 5/1976 | Sands | 428/95 |
| 4,053,668 A | 10/1977 | Kimmel et al. | 428/95 |
| 4,069,361 A | 1/1978 | Kumar | 428/95 |
| 4,123,577 A | 10/1978 | Port et al. | 428/95 |
| 4,131,704 A | 12/1978 | Erickson et al. | 428/95 |
| 4,140,071 A | 2/1979 | Gee et al. | 112/266 |
| 4,242,394 A | 12/1980 | Leib et al. | 428/95 |
| 4,342,813 A | 8/1982 | Erickson | 428/296 |
| 4,814,219 A | 3/1989 | Burgess et al. | 428/113 |
| 5,925,434 A | 7/1999 | Phillips et al. | 428/95 |
| 5,962,101 A | 10/1999 | Irwin, Sr. et al. | 428/92 |
| 6,060,145 A | 5/2000 | Smith et al. | 428/95 |
| 6,280,818 B1 | 8/2001 | Smith et al. | 428/95 |

FOREIGN PATENT DOCUMENTS

EP 0005050 4/1979

OTHER PUBLICATIONS

Sabit Adanur, Handbook of Weaving, 2001, p. 365.
Amoco Fabrics and Fibers Company Brochure, "Carpet Backings, 2001" (including sample).
Darius Helm & Gregory Slomba, "The 2001 Backing Report", FOCUS (Jan./Feb. 2001) p. 28 et. seq.
PCT–Int. Pub. #WO 96/29460; Date Sep. 26, 1996 –Title: Improved Carpet Construction and Carpet Backings for Same.

Primary Examiner—Elizabeth M. Cole
(74) Attorney, Agent, or Firm—Stephen L. Hensley

(57) ABSTRACT

Tuftable primary backings comprise a closed-weave, woven tape fabric to which is affixed a coherent web layer comprising staple fibers with fibers oriented in at least two directions and a plurality of the fibers being fused. The web layer is affixed to the fabric by penetration of fibers from the web into the fabric. The backings have substantial weftline straightness and stability against deformations in the machine, cross and off-axis directions. Improved tufted goods and methods for making the composites and tufted goods are also provided.

30 Claims, 2 Drawing Sheets

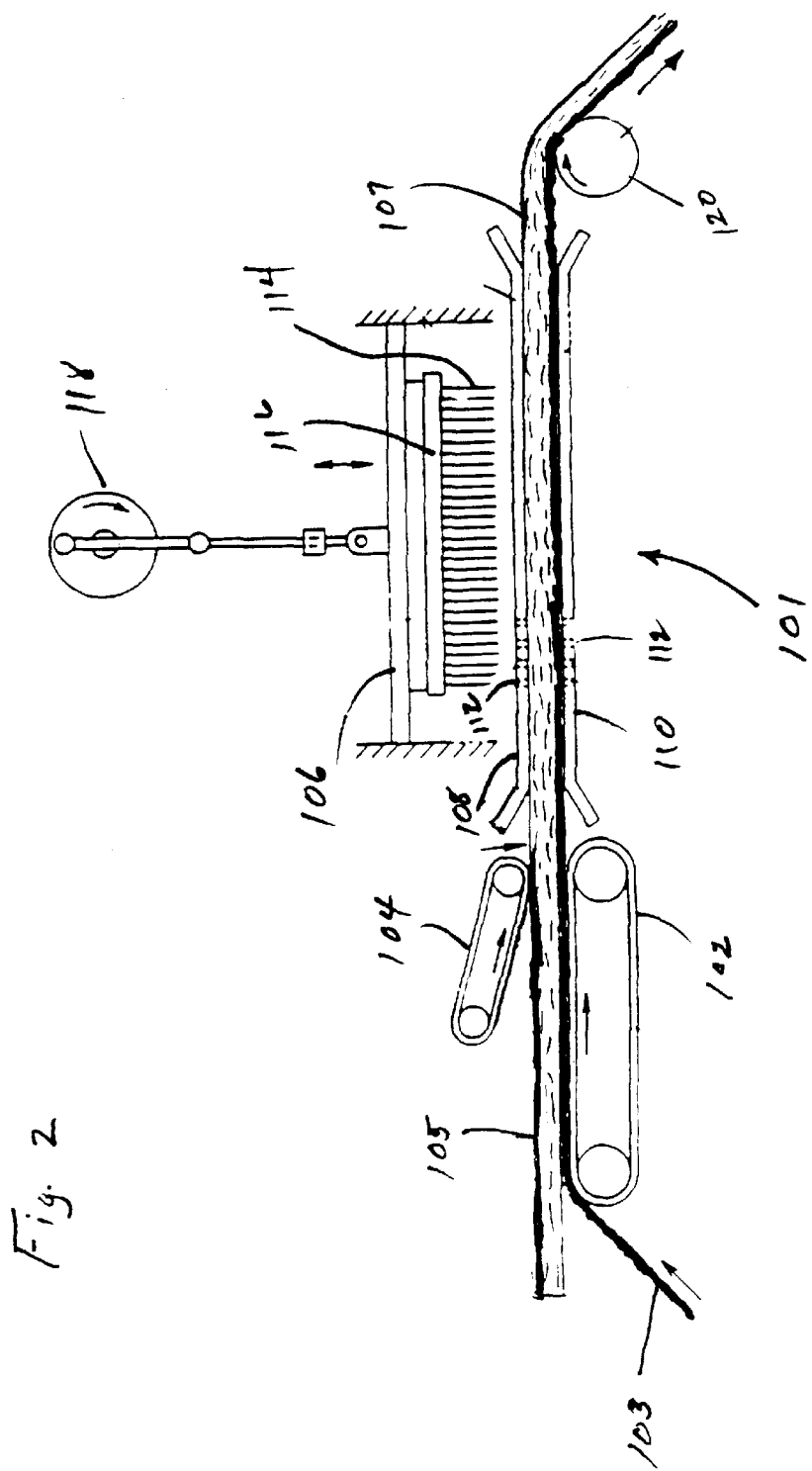

TUFTABLE AND TUFTED FABRICS

This invention relates to tuftable fabrics and tufted products and, more particularly, primary carpet backings and tufted carpets.

BACKGROUND OF THE INVENTION

Most backings for carpets are fabrics woven from synthetic yarns. While many fabric constructions, yarn configurations and compositions have been used or described in published sources, woven polypropylene tape fabrics are preferred primary backings due to desirable properties that include tuftability, strength, mold resistance and cost.

For some applications, however, conventional backings have limitations. For example, although nonwoven polyester backings are typically more expensive than woven tape primary backings, polyester nonwovens are often favored for fine and intricate patterned, tufted broadloom carpets because even minor irregularities in the weave of woven backings can lead to pattern nonuniformity and mismatches when the backings are tufted. With growing emphasis on style and design in pattern-tufted carpets, demands on backings for regularity and stability will increase.

In woven primary backings, irregularities typically take the form of various deviations from weftline straightness. One such deviation, commonly referred to as "bow," occurs when weft yarns are disposed in the shape of an arc, instead of straight, across the backing. Another, referred to as "skew," occurs when weft yarns are not perpendicular to warp yarns but instead are diagonally offset or skewed across the fabric. When backings with bow or skew are tufted, misalignment of tufting needles with weft tapes may result and contribute to pattern distortion and mismatch. Random, isolated deviations from straightness in segments of a backing's weftline, or "blips," can also occur and extra thickness of fabrics in selvage areas can cause deviations known as "hooking."

For pattern-tufted broadloom carpets, resistance of both backings and tufted backings (also referred to as "greige goods") to even small, in-plane deformations also is important for pattern uniformity. While traditional woven polypropylene tape backings have good resistance to deformations in the directions of their warpwise and weftwise axes, better stability of some nonwovens against off-axis deformations is an advantage when tufting fine and intricate patterns. With woven backings, shifting of the weave and nonuniform movement of backings as they advance through tufting can result in unacceptable bow, skew, other distortions, pattern mismatches and nonuniformity. When goods are not properly aligned during passage through finishing steps, such as dyeing, application and drying of backcoats, the tufted backings can skew if one side moves ahead of the other. Bow and skew can occur if greige goods experience different cross-machine direction tensions as they move through drying ovens, such as from dragging over rolls, nonuniform roll diameters, and roll misalignment. Irregularity also can result when greige goods are not stretched in the cross-machine direction sufficiently to maintain straightness of weft yarns.

It is known that needling, fusing or needling and fusing fibers or nonwoven fibrous webs or fabrics can improve dimensional stability and other properties of woven backings. The needled or fused fibers stabilize the weave against shifting. In addition, penetration of fibers through the weave as a result of needling and/or tufting can cause packing of fibers around tufts where they penetrate the backing, thereby contributing to stitch lock. The terms "calendar-lock weave" and "fiber-lock weave" ("CLW" and "FLW") are well known in the carpet backing industry as designations for composites with fibers or nonwoven webs fused to woven backings, or fibers needled to woven backings, respectively.

U.S. Pat. No. 3,605,666 describes FLW composites having a woven backing fabric needled with a web or batt of selected, garneted staple fibers to provide a backing surface that is dye-compatible with carpet face yarn. In tufted carpets, the nonwoven layer is disposed on the pile side and said to improve appearance by hiding the woven fabric and reducing light reflection. The woven fabric is preferably woven from polypropylene filaments and the nonwoven is described as a thin but dense material, with preferred staple fiber lengths of 1–4 inches. The patent does not attribute improved dimensional stability to the needled nonwoven web, stating instead that the woven fabric provides substantially all of it in the disclosed products.

U.S. Pat. No. 4,053,668 describes manufacture of carpets by tufting a woven tape fabric that has been needled with a layer of staple fibers deposited onto it. The composites are described as having improved dimensional stability as a result of yarns in the weave being held against relative sliding by the needled fibers. Carpets made from the backings are tufted so that the needled layer is disposed on the back side of the tufted structure. The woven fabric is a woven polypropylene scrim with ribbon filaments; a 30×11 construction of 45 mils wide, 2.2 mils thick warp tapes and 90 mils wide, 3.6 mils thick weft tapes and weighing 3.3 ounces per square yard ("osy") is preferred. Nylon staple fibers are preferred for dye-compatibility with face yarns, with lengths of 1.5–3 inches, deniers of 15–20, and an application rate of 5.5 osy.

Another composite backing described as providing improved dimensional stability and, specifically, resistance to bow and skew for improved pattern definition in printed carpets, is found in U.S. Pat. No. 4,069,361. The backings have a woven primary backing fabric to which is needled a 0.5–3 osy batt of staple fibers, which are then fused to form an integrated composite structure. The fabric is woven from polypropylene tapes or filaments. The batt is composed of staple fibers that can be fused without fusing or adversely affecting the woven fabric. Staple fibers composed of polypropylene are specifically disclosed.

Improved dimensional stability of needlepunched nonwovens composed of polypropylene staple fiber and fused at least at one surface, and use of the nonwovens in carpet backings, are also known from Canadian Patent 1,185,844.

U.S. Pat. No. 4,123,577 describes CLW primary backings having a woven polypropylene tape fabric to which is fused a nonwoven fabric composed of dyable fibers in combination with heat fusible fibers. The backings are characterized by improved dimensional stability, including stability for fine gauge tufting, and dye-compatibility of the fused layer with face yarns. Fusing the nonwoven to the woven is said to result in backings with higher tensile strength than FLW composites because needling the composite is avoided. Woven polypropylene tape primary backings and nonwoven fabrics composed of blends of nylon and polypropylene fibers are disclosed. Nonwoven fabric weights are about 3–70 $g/m^2$ (0.09–2 osy), with preferred weights as small as possible while providing desired dimensional stability and coverage to avoid grinning.

U.S. Pat. No. 4,140,071, noting difficulties with composites of woven backing fabrics needled with carded staple fiber webs of low basis weight, describes carpets made by tufting face yarn simultaneously through a woven polypropylene tape primary backing fabric and a bonded, lightweight nonwoven web of dyable continuous filaments. Improved tensile and tear strength are said to result from use of the bonded, continuous filament nonwoven, as compared to separate needling of the woven and nonwoven fabrics. Disclosed web weights are about 13–30 g/m$^2$ (about 0.4–0.9 osy). Improved dimensional stability of finished carpets is also said to result from tufting simultaneously through a woven or nonwoven backing fabric, such as a conventional primary backing, and a stronger, less stretchable open weave backing fabric, such as conventional secondary backing, according to U.S. Pat. No. 5,962,101.

U.S. Pat. No. 4,242,394 describes a three-component primary backing, said to have excellent dimensional stability, in which a woven polypropylene tape primary backing fabric and a woven, extruded net or continuous filament nonwoven reinforcing layer are needled with a layer of 2½–3 inches long, 3–15 denier staple fibers. Staple fibers composed of polypropylene, polyester and nylon are disclosed.

Secondary carpet backings with needled woven and nonwoven fabrics also are known. While tuftability, strength and stability against deformation in tufting and finishing operations are features of importance for primary backings, penetrability and adhesiveness of binders such as latex formulations and stability against large strain deformations, such as those encountered in handling, installation and use of finished carpets, are more important in secondary backings. Thus, while primary backings are typically closed weave fabrics with tapes in both the warp and weft, secondary backings are more commonly open weave fabrics, frequently with spun or filament yarns instead of tapes in at least one of the warp and weft for better binder penetration and adhesion. Secondary backing fabric composites with needled fibers and nonwoven fabrics for improved stability, adhesion, and aesthetic properties are well known. Thus, U.S. Pat. No. 3,817,817 discloses composites with improved dimensional stability and hand in the form of woven polypropylene ribbon fabrics with needled staple fibers. The needled staple fibers form a layer on the backing surface that ultimately forms the bottom of finished carpets, with penetration of fibers through the backing also said to aid in preventing edge raveling and improving adhesion of binders. Polypropylene staple fiber lengths of 1½ inches, deniers of 15, application weights of 1½–2 osy and needling at 234 needlepunches per square inch are preferred. A recent example is found in U.S. Pat. No. 6,060,145.

While composite backings having woven fabrics needled with, fused to, or needled with and fused to staple fibers and staple fiber or continuous filament nonwovens are well known as backings for tufted carpets and have been recognized for dimensional stability, resistance to bow and skew, improved tuft lock and other benefits, composites also have limitations. Those with staple fibers or nowoven webs needled or fused to woven backing fabrics tend to resist deformations better than their woven fabric components, but penetration of needles and face yarn during tufting tends to disrupt integrity of the nonwovens or fiber layers, thereby reducing the stability they impart. Thus, deformations due to tufting and variability in finishing still can cause pattern mismatches.

Tufting woven backings and nonwovens brought together at the tufter, instead of previously needled or fused into composites, avoids losses of stability due to prior needling but the separate fabrics can both be sources of irregularities and require added, more complex handling and control equipment to be integrated with tufting.

Fusion of fibers or nonwovens to woven primary backing fabrics avoids loss of strength and stability due to needling; however, fused resin agglomerates can cause tufting needle deflection and, in turn, pattern distortion. Fusing woven backings and fibers or nonwovens also requires that the latter include fibers composed wholly or partly of synthetic resins that melt at temperatures below those at which woven backings are damaged by heat exposure. Beyond costs of lower melting resins, their compatibility with other backing or carpet materials in terms of adhesion of carpet binders, processibility, and recyclability are concerns. Effects of different resin compositions on dye receptivity, light reflectance and other properties may be unpredictable and affect product quality.

Thus, there are needs for tufted carpets with improved pattern uniformity and tuftable backings with improved dimensional stability, and particularly stability against small in-plane deformations for intricate tufting, and retention of stability during and after tufting.

SUMMARY OF THE INVENTION

Briefly, this invention provides improved tuftable backing composites, tufted products and methods for their manufacture.

In one embodiment, the invention provides tuftable backing composites that comprise a tuftable closed-weave fabric comprising warp and weft tapes and having a coherent nonwoven web of staple fibers in contact with one surface of the fabric without fusion thereto and a plurality of fibers from the web penetrating the fabric to attach the web to the fabric, wherein the fibers have a weight of 1 to about 4 osy, the fibers of the web are oriented in at least two directions and a plurality of the fibers of the web are fused, and wherein weft tapes of the composite have weftline straightness suitable for patterned tufting and the composite has stability against deformation during tufting as indicated by machine-direction deformation resistance of at least about 20 pounds and off-axis deformation resistance of at least about 4 pounds/inch. Such composites tufted with or further comprising tufted face fibers are also provided.

In another embodiment, the invention provides a tufted product comprising a backing having face yarn penetrating therethrough to form a plurality of tufts on a face side and a plurality of stitches on a stitched side, wherein the backing comprises a closed-weave fabric comprising warp and weft tapes and a coherent nonwoven web of staple fibers on the stitched side and in contact with a surface of the fabric without fusion thereto and a plurality of fibers from the web penetrating the fabric, wherein the fibers have a weight of 1 to about 4 osy, the fibers in the web are oriented in at least two directions and a plurality of the fibers in the web are fused, and wherein the tufted product has machine direction deformation resistance of at least about 15 pounds and off-axis deformation resistance of at least about 2.5 pounds/inch.

Another embodiment of the invention provides a method for making a tuftable backing comprising needling to a tuftable, closed-weave fabric comprising warp and weft tapes a coherent nonwoven web comprising staple fibers oriented in at least two directions and a plurality of which are fused, wherein the web has a weight of 1 to about 4 osy and off-axis deformation resistance of at least about 2.5 pounds/inch and the needling is effective to affix the web to the fabric and stabilize the fabric.

In another embodiment, the invention provides a method for making a tufted product that comprises tufting face yarn into a first side of a tuftable backing composite comprising a tuftable, closed-weave fabric comprising warp and weft tapes and having a coherent nonwoven web of staple fibers in contact with a surface of the fabric on the first side without fusion thereto and a plurality of fibers from the web penetrating the fabric to attach the web to the fabric, wherein the fibers have a weight of 1 to about 4 osy, the fibers in the web are oriented in at least two directions and a plurality of the fibers in the web are fused, and wherein the weft tapes of the composite have weftline straightness suitable for patterned tufting and the composite has stability against deformation during tufting as indicated by machine direction deformation resistance of at least about 20 pounds and off-axis deformation resistance of at least about 4 pounds/inch.

For purposes hereof, the terms "machine direction," "cross-machine direction", "warp" and "weft" are used for their commonly accepted meanings. "Machine direction" refers to a direction corresponding to the direction of advancement through a process line while "cross-machine", or simply "cross," "direction" corresponds to a direction transverse to the machine direction. "Warp" tapes refer to tapes with lengths in the machine direction while "weft" tapes are tapes with lengths in the cross direction. The term "mils" means one—one thousandth (0.001) of an inch. "Machine direction deformation resistance," abbreviated "MDR," refers to force, applied in the machine direction in the plane of a sample, such as a composite, fabric or tufted product, required to cause 5% elongation of the sample. "Off-axis deformation resistance," abbreviated "ODR," refers to force, applied at a 45° angle to the machine direction in the plane of a sample, required to cause 5% elongation of the sample. MDR and ODR are determined according to procedures described in detail immediately preceding the examples.

BRIEF DESCRIPTION OF THE DRAWINGS

The invention is illustrated with reference to the drawing, in which

FIG. 2 illustrates an equipment line for making the composites.

DETAILED DESCRIPTION OF THE INVENTION

Figure 1:
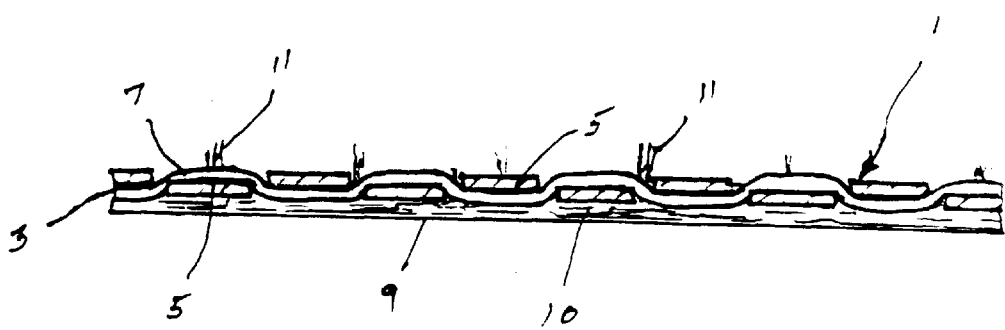
FIGS. 1 and 3 are expanded sectional views of a backing composite, and a tufted carpet, respectively, according to the invention.

In greater detail, the invention provides tuftable backing composites and tufted products with improved warpwise and off-axis resistance to small in-plane strains. Straightness of weft tapes as present in the composites, and stability against deformation during tufting, make the composites useful for manufacture of tufted carpets, and particularly patterned carpets. Pattern regularity in the tufted backings and finished carpets is improved as a result of stability in tufting. Even broadloom tufted carpets with intricate patterns and designs can be tufted with considerably better appearance and efficiency than with conventional woven primary backings.

Manufacture of the composites and tufted products according to the invention can provide benefits including avoidance of unpredictable performance due to mixed resin fibers or mixed fiber webs of the type required for fused composites, uniform tracking through tufting lines and suitability for high speed tufting due to stability of the composites and of backings during tufting. Manufacture of the composites can provide further improvements by reducing one or both of bow and skew of weft yarns in woven fabrics used to make the composites.

The invention proceeds from the discovery that certain nonwoven staple fiber webs with weights light enough not to impede tufting can be affixed to closed-weave primary backing fabrics to form tuftable composites with not only weftline straightness, including low levels of bow and skew, suitable for patterned tufting but also retention of stability during tufting. The nonwoven web is affixed to the woven fabric by penetration of the fabric by a plurality of the fibers, such as by needling, over the surface of the fabric. Stability of the web derives from coherency of the web, fibers thereof being oriented in at least two directions in the plane of the web, and a plurality of the fibers of the web being fused to other fibers. As a result, even at relatively light web weights favored for unimpaired tufting, the webs have enough strength and integrity to withstand mechanical bonding to the fabric and tufting without undesirable loss of stability. Penetration of the fibers of the web into the fabric, together with fiber-to-fiber fusion bonding within the web, anchors the web to the fabric and provides resistance to shifting of the weave. Integrity and stability of the web as present in the composites and in tufted products is not as great as in the initial web as a result of the disruption of the web and its fiber-to-fiber bonding that occur during attachment to the fabric and penetration of tufting needles and face fibers. However, the web retains enough integrity that both the composites and tufted products are more resistant to deformations that can cause distortion in patterned tufting.

The invented composites have a tuftable, closed-weave, woven tape fabric with a coherent nonwoven staple fiber web affixed to the fabric at a surface thereof. The woven fabric has a closed-weave for strength, tuftability and securing of face yarn tufts to the composite backing. The closed weave also contributes to good attachment of the web to the fabric. The web is affixed to the fabric by penetration of the fabric by fibers from the web. Fibers penetrate into or through the fabric, typically at interstices formed by crossovers of warp and weft tapes, through the tapes themselves or both. Typically, at least some fibers penetrate all the way through the woven fabric, as indicated by presence of at least some loose fiber ends on the composite surface opposite the surface formed by the web layer. Penetration of the fabric by fibers of the web preferably results from needling through the web into the fabric with a plurality of barbed needles to force fibers into or through the fabric. The composites preferably have about 50 to about 400 needle penetrations per square inch ("ppi"), with fibers from the web penetrating the fabric at a plurality of needle penetrations, to attach the woven and nonwoven components with good retention of web stability. More preferably, needle penetrations are about 50 to about 300 ppi, and most preferably 50 to about 200 ppi, for good attachment of the web to the fabric and stability of the composites.

The fibers of the web are staple fibers. Preferably, average lengths are about 1 to about 10 inches and deniers are about 1 to about 15. More preferably, fiber lengths are about 2 to about 8 inches and deniers are about 1 to about 10. Weight of the web in contact with the fabric and of its fibers penetrating the fabric is 1 to about 4 osy. Lighter weights may be inadequate to stabilize the composites while weights above about 4 osy can impede needle penetration and cause heat build-up due to friction during tufting. The web in contact with the fabric surface is present as a thin but dense layer owing to its coherency. Preferably, coherency is such that a layer with weight of 1 to about 4 osy has thickness no greater than about 45 mils, and more preferably about 10 to about 35 mils. Needlepunched webs, most preferably with about 150 to about 600 ppi, are preferred for coherency.

Fibers of the web are oriented in at least two different directions within the web. Preferably, at least one such direction, and more preferably at least two such directions, is at an acute angle to the warp of the composite. At least a plurality of the fibers of the web is fused. Fusion of the fibers can exist predominantly at one or both surfaces of the web, in the interior of the web or at one or both surfaces and in the interior, though it is preferred that not all the fibers are fused. Fusion of the fibers manifests itself as bonding of fibers to other fibers at intersections thereof and with some or even substantial loss of fibrous character due to flattening of the fibers on fusion, though not to an extent that a film or significant film-like domains are present within the web. Preferred composites have fibers of the web fused at least at the web surface that is not in contact with the fabric. Fusion of the fibers of the web together with coherency of the web and orientation of fibers in more than one direction contribute to in-plane stability of the composites in all directions and retention of stability during tufting. Penetration of fibers into the woven fabric of the composites disrupts fiber-to-fiber bonds, but without too much loss of integrity of the web or stability of the composites for good tufting performance.

FIG. 1 illustrates an embodiment of the invented composites. Composite 1 has closed weave fabric 3 with warp and weft tapes as at 5 and 7, respectively. Coherent nonwoven web 9 comprises staple fibers 10, a plurality of which are fused, and forms a layer in contact with the fabric. Fibers 11 are seen penetrating the fabric.

Properties of the nonwoven web, together with its attachment to the closed weave, woven tape fabric by penetration of fibers, contribute to retention of weftline straightness and resistance to deformation of the composites and in tufted fabrics. Straightness of weft tapes of the composites is suitable for patterned tufting. Thus, there is sufficient regularity of weftlines as not to introduce unacceptable distortion during tufting. Preferably, weftline straightness is such that bow of the weft tapes in the composites is less than about 0.7% and skew of the weft tapes is less than about 1.2%. Preferred composites also have a substantial absence of blips in their weftlines. More preferably, bow is 0 to about 0.5% for fine pattern-tufting. Skew is more preferably 0 to about 0.9%, and most preferably no more than 0.7%. For purposes hereof, percent bow and skew are determined as described in Adanur, *Handbook of Weaving* (2001) p. 365, and reflect an average of maximum displacements of bowed and skewed wefts, respectively, from their corresponding straight weftlines as a percentage of fabric width.

Weftline straightness is important for limiting backings' contributions to irregularities in tufted goods. However, straightness by itself does not indicate ability of a backing to resist distortion as it advances through tufting. Stability in that respect is better indicated by MDR and ODR, which are measures of resistance to small strains applied in the plane of the backing in the machine direction and at an acute angle thereto, respectively. From a practical perspective, MDR indicates ability of a material, such as a fabric, web, composite or tufted product, to maintain straightness of weft tapes, or of a tufting pattern, despite small differences in machine direction-oriented tensions across their crosswise dimension, as when the sample is fed from a feed roll with random or isolated tape build-ups that create thicker and thinner areas from side-to-side on the roll. ODR indicates resistance to variations in advancement from side-to-side (i.e., across a material's cross dimension) during tufting or finishing, as when rolls in the process line are misaligned, thickness of the material varies across its cross direction or crosswise tensioning devices in dyeing or finishing are mismatched from side-to-side. Force required for elongations of 5% is used in determining MDR and ODR because 5% elongation is large enough to be measured without sophisticated testing methods and devices, but similar to small deformations that can cause noticeable distortion in tufted goods.

Accordingly, it will be appreciated that in addition to weft tape straightness suitable for patterned tufting, important attributes of the invented composites are MDR and ODR. MDR of the invented composites is at least about 20 pounds, and preferably about 22 to about 50 pounds for good machine-direction stability in composites with weights and constructions preferred for tuftability. Most preferably, MDR is about 25 to about 30 pounds. ODR of the composites is at least 4 pounds/inch, with about 4.5 to about 12 pounds/inch preferred for a desirable combination of off-axis resistance to distortion and tuftability. Most preferably, ODR is about 5 to about 10 pounds/inch.

Weights of the composites preferably are about 3 to about 8 osy for most typical carpet applications. Higher weights can be used, although weights that are too high can interfere with tuftability while weights below about 3 osy tend to result in flimsy or weak tufted goods. Preferred weights are about 3.5 to about 7 osy.

Another property that can influence overall performance of the composites in carpet manufacture is air permeability. While the web layer of the composites and the fused fibers thereof may reduce permeability of the composites as compared to conventional woven primary backings, attachment of the web to the fabric by needling can increase permeability of the composites if the needling density is high enough, and even at lower densities, web weights are low enough that the composites have adequate permeability. Preferred composites have sufficient permeability to allow for drying of liquid latex formulations used as binders in carpet finishing without substantial variations in drying techniques and conditions. Composites according to the invention most preferably have air permeabilities, determined according to ASTM D-737 under a differential pressure equal to 0.5 inch of water, of about 10 to about 100 $ft^3/min/ft^2$.

A preferred composite construction according to the invention comprises a closed-weave, 24×18 woven tape fabric having a coherent web about 15 to 25 mils thick of polypropylene staple fibers with average length of about 3–6 inches and denier of about 3–8 in contact with a surface of the fabric without fusion thereto, with about 60 to about 150 ppi such that a plurality of fibers from the web penetrate the fabric, wherein the web and the fibers penetrating the fabric weigh about 1.5 to about 2.5 osy, and fibers of the web are fused at least at a surface thereof not in contact with the fabric. More preferably, the closed-weave fabric has about 100 to about 130% coverage in the warp and about 110 to about 180% coverage in the weft. The nonwoven web more preferably is needlepunched for coherency, with about 300–500 ppi being most preferred. Weft tapes of the composites have bow less than about 0.5% and skew less than about 0.9%. MDR is about 25 pounds and ODR is about 5 pounds/inch.

The woven fabric of the invented composites is a tuftable, closed-weave fabric comprising warp and weft tapes. The fabrics preferably are woven entirely from tapes in both the warp and weft directions. Generally, fabric constructions with average warp counts of about 10 to about 42 tapes per inch and average weft counts of about 10 to about 22 tapes per inch are suitable, with average warp counts preferably exceeding average weft counts for tuftability, strength, stability and weaving efficiency. For patterned-tufting in currently preferred carpet styles, especially preferred constructions have at least about 24 warp tapes per inch and about 10 to 18 weft tapes per inch.

Preferred closed-weave fabric constructions have warp and weft tape counts, tape dimensions and weave to provide at least about 95% coverage in both the warp and weft directions. For purposes hereof, coverage refers to theoretical coverage determined by multiplying average counts by tape width. Thus, for example, in a construction with an average of 24 warp tapes per inch, warp tapes at least 39 mils wide (1 inch×95%/24 tapes/inch) provide at least 95% coverage in the warp. More preferably, woven fabrics present in the composites have coverages of about 95% to about 185% in each of the warp and the weft, with about 100 to about 150% in the warp and about 100 to about 180% in the weft being most preferred.

Weight of the woven fabric is great enough to provide strength, tear resistance and integrity for attachment of the nonwoven and subsequent tufting, though not so great as to impede handling, needling or tufting. Generally, fabric weights of at about 2.5 to about 4.5 osy provide a good balance of strength and tuftability. Preferred weights are about 3 to about 4 osy.

A preferred woven tape fabric for the invented composites is a 3 osy, 24×11 plain weave fabric with coverages of about 120% in the warp and about 105% in the weft. Another example of a preferred woven tape fabric is a 4 osy, 24×18 plain weave fabric with warp coverage of about 120% and weft coverage of about 170%.

The fabrics are preferably woven in a plain weave to provide a desirable combination of coverage and strength. However, other weaves also can be used; examples include twill and leno weaves. Weaving of fabrics from tapes is well known and typically conducted using a suitable loom which operates by insertion of weft tapes over and under alternating warp tapes with shifting thereof relative to one another to alternate the over and under disposition of tapes within the final fabric. The fabrics can be provided with any desired selvage treatment, such as tucked, alternating tucked and untucked, and latch cord selvages. For resistance to hooking in composites in which the web extends over the full surface of the woven fabric, latch cord selvages are preferred. A tufting lubricant often is applied to the warp or weft tapes or both to facilitate tufting; lubricants and their use are well known. After weaving, fabrics are usually taken up, for example on a roll, or they can be advanced to needling or other suitable processing to form the invented composites without intermediate take-up if desired.

The tapes of the woven fabrics are essentially flat structures, with significantly greater average width than average thickness. Generally the ratio of average width to average thickness is at least about 10:1 and preferably from about 20:1 to about 200:1. Generally, for woven fabrics with constructions and coverages described above, tape widths of about 30 to about 120 mils are suitable, with about 40 to about 100 being preferred. Thickness of the tapes ranges from about 1 to about 3 mils. Cross-sections of the tapes can be rectangular or contoured, for example, with striations or with grooves, ridges, serrations or other profiles. Contoured tapes are sometimes preferred, especially for fabrics used as backings in high speed tufting, because they are more easily penetrated by tufting needles and with less heat generation than flat tapes. Preferred contoured tapes have thinner and thicker areas alternating across their widths and extending along their lengths. A preferred contoured tape is a serrated tape as described in commonly assigned U.S. Pat. No. 5,925,434, which is incorporated herein by reference.

Tapes can be composed of any thermoplastic resin composition capable of being formed into tape suitable for weaving into a tuftable fabric. Examples of resin compositions include polyolefins, such as polypropylene and propylene-ethylene copolymers, polyesters and nylons. Polyolefins are preferred for performance and cost. More preferably, the thermoplastic resin composition comprises a polypropylene homopolymer or copolymer resin, with homopolymer polypropylene being most preferred. The resin compositions can contain pigments, stabilizers, antimicrobial agents, fillers and other suitable additives. Such materials and their use are well known in the art.

Tapes can be prepared by any suitable method. Commonly, thermoplastic resin compositions are extruded into tapes using suitably configured dies, or in the form of a film that is slit into tapes after cooling. In both extrusion and slit film methods, tape thickness can be regulated by adjusting width of the gap in the tape or film die. Tapes with contoured surfaces are conveniently made using tape or film extrusion dies with appropriate profiles. In tape extrusion, tape widths are typically controlled with inserts placed into the die gap. In slit film processes, spacing of cutting means used to slit the film can be adjusted to provide desired widths. In both processes, tapes usually are drawn to increase tenacity. In tape extrusion, tapes are typically drawn or stretched after extrusion and quenching. A result of stretching is that the finished tapes are somewhat narrower and thinner than the undrawn tapes; such changes are normally accounted for by adjusting die dimensions to achieve desired final tape dimensions. Similar considerations also apply in slit film processes, although adjustment of cutting means spacing may vary depending on whether stretching precedes or follows slitting the film. These effects and adjustments to account for changes in dimensions due to stretching or other drawing techniques are known to those skilled in the art of tape manufacture. Tapes also are often annealed to reduce their tendency to shrink. Extrusion, slitting, drawing and annealing techniques are well known to persons skilled in the art.

The nonwoven web used to make the invented composites is a coherent staple fiber web comprising fibers oriented in at least two directions within the web and a plurality of fused fibers, weighing 1 to about 4 osy and having ODR of at least about 2.5 pounds/inch. Preferred webs weigh about 1.5 to about 3.5 osy because they impart excellent stability and retention thereof with little effect on tuftability. Most preferably, web weights are about 2 to about 3 osy. ODR of the webs preferably is about 3 to about 10 pounds/inch for good stability and tuftability, with about 4 to about 8 pounds/inch most preferred.

Average lengths of the staple fibers of the webs are about 1 to about 10 inches, with about 2 to about 8 inch lengths being preferred. Fiber deniers are generally about 1 to about 15, with finer fibers providing advantages in coverage but coarser fibers providing greater air permeability. The fibers of the web can be crimped or uncrimped; crimp levels are preferably about 4 to about 30 crimps per inch. Fibers of different lengths, deniers, crimp or combinations thereof can be present in the webs.

Fibers of the web are oriented in two or more directions, contributing to strength and stability in multiple directions. Preferred webs are about 10 to about 40 mils thick. The webs preferably are needlepunched for coherency. Nonwoven webs needled at about 200 to about 600 ppi provide especially good coherency. Fusion of the fibers of the web is present at one or both of its surfaces, in the interior of the web, or at one or both surfaces and in the interior, and most preferably at least at one surface of the web but without fusion of all of the fibers of the web. As described above, fusion of the fibers is such that fibers are bonded at their intersections. Flattening of the fibers at their fused junctions or intersections is typically observed, although not to the extent of film formation or substantial impermeability to passage of air through the web.

The webs comprise fibers that are fused and, therefore, include at least some fibers of a thermoplastic resin. Preferred webs are those substantially or entirely composed of thermoplastic fibers. Most preferably, the fibers comprise polypropylene for compatibility with the polypropylene woven backing fabrics that are preferred for the invented composites. Other suitable thermoplastic fibers include polyester fibers, fibers of other polyolefins such as polyethylenes, ethylene-propylene copolymers and blends of polypropylene with other resins such as polybutenes, so-called metallocene or single site polyethylenes, low and linear low density polyethylenes.

Generally, nonwoven webs suitable for the invented composites are made by processes that comprise the steps of carding staple fibers, lapping two or more webs of carded fibers to form a batt, drafting the batt in a machine and a cross machine direction, needling the batt and fusing fibers of the drafted, needled batt. Several processes and techniques are well known for forming nonwoven staple fiber webs. Examples include processes such as disclosed in U.S. Pat. No. 4,131,704, U.S. Pat. No. 4,342,813 and U.S. Pat. No. 4,814,219.

A preferred process for making the webs comprises carding a plurality of staple fibers, crosslapping two or more carded webs to form a batt, drafting the batt in at least one of a machine and cross direction, needling the drafted batt, drafting the needled batt in at least one of the machine and cross directions and fusing fibers of the needled batt drafted in the machine and cross directions.

Staple fibers typically are supplied to a carding device in bales or bundles, which are opened mechanically by pickers with teeth or needles that open and tear apart the compacted fibers. Revolving flat, stationary flat, workerstripper or other suitable processes can be used for carding. The card combs fibers into substantial alignment. Two or more carded webs are crosslapped to form a lapped batt. The number of webs used to form the batt depends on factors such as weights of the webs and of the batt to be formed and extent of subsequent drafting and needling to be performed, as known to persons skilled in the art.

The lapped batt is drafted in the machine direction by suitable means, such as by passage through two or more nip roll pairs. When using nip roll pairs, 2 pairs are sufficient for drafting, although additional sets of rolls can be used to provide greater uniformity because smaller, better controlled drafts can be performed between consecutive pairs in the system while still achieving a greater, desired overall draft. Drafting results from each roll pair being operated successively faster than a preceding inlet or roll pair. Generally 2 to about 6 roll pairs are used, with an overall draft ratio within the range of about 1.01 to about 4, and more preferably about 1.2 to 1.8. Maximum draft between any two adjacent roll pairs is about 2, and more preferably about 1.5.

The drafted batt is passed to a needle loom or other suitable needling device, at which the batt is needled to form a more coherent web. One or more needling devices can be used. Needles reciprocate into and out of the batt as it advances through the device. Needling density preferably is about 200 to about 500 ppi, with needle penetration of about ¼ to about ¾ inch. Typically, needling produces additional draft.

The drafted, needled batt is preferably again drafted in the machine direction using suitable means, such as another nip roll system. The draft ratio in the second draft is preferably about 1.01 to about 2, and more preferably about 1.3 to about 1.5. Small incremental drafts between adjacent roll pairs in a series of three or more pairs provide greater uniformity than a single larger draft using two roll pairs. The needled batt drafted in the machine direction before and after needling is then drafted in the cross direction. Preferably, this is done using a tenter frame or other suitable cross-web stretching device. The drafting ratio preferably is about 1.01 to about 1.5 and more preferably about 1.1 to about 1.3.

The machine and cross direction-drafted web is then fused. Fusion involves heating at a temperature high enough to melt at least a portion of the resin of the fibers, with application of sufficient force to press the heated fibers together to bond them at their intersections. In webs of polypropylene fibers, a suitable temperature range is about 163°–191° C. Higher temperatures within the range may be preferred when high feed rates are used to reduce the time for fusion and also may promote web stability. Fusion is conveniently accomplished by contact of the web with at least one heated roll. Fusion also can be conducted by infrared heating instead of, or in addition to, hot roll fusion. Quartz and foil-strip heaters are examples of suitable heating means for infrared fusion.

When fusion is conducted by contacting the needled and drafted batt with heated fusion rolls, the rolls are heated, for example, by interior circulating hot oil, resistance heaters, high pressure steam or other suitable heating fluid passed therethrough. Temperature of heated fusion rolls can be varied depending on the force applied at the nip and the rate at which the web is contacted with the heated roll. Typically lower temperatures are suitable when using higher nip forces. Nip forces of about 20 to about 1,000 pounds per lineal inch ("pli") are typical, with about 50 to 500 phi being preferred and about 100 to about 300 phi most preferred. Temperature and nip force are applied across substantially the entire width of the web for substantially uniform fusion across the web. The web can be contacted with the heated fusion roll at any suitable rate, the same normally being dependent on the equipment employed. At higher rates, e.g., greater than about 50 feet/minute, higher temperatures, nip forces or both can be used, while slower rates may benefit from lower temperatures or forces to prevent filament degradation.

When fusion is conducted by both hot roll and infrared heating, the web is most preferably fused by infrared heating after needling and drafting, and then hot-roll fused at least at one surface. Infrared heating is preferably conducted by passing the needled, drafted web so that both surfaces thereof are exposed to radiation.

If desired, the batt or web can be subjected to a variety of modifying agents at any suitable point during processing. Thus, components such as dyes, pigments, binders, thickening agents, softening agents, detergents, surface active agents and the like and combinations thereof may suitably be applied to the fabric before, during or after needling or drafting. In some cases, modifying agents can suitably be applied after the web is fused.

The composite backings according to this invention are prepared by bringing the woven fabric and the nonwoven web into contact and forcing a plurality of fibers of the web through the fabric to affix the web to the fabric. Preferably, the fibers of the web are forced through the fabric by needling through the web into the fabric such that a plurality of fibers of the web are disrupted from the web and penetrate the fabric.

In a preferred method for forming the composites, the web and the fabric are brought together such that the web is in contact with the fabric over substantially the entire surface of the web, and the contacted layers are needled at about 50 to about 400 ppi such that the needles penetrate the web and the fabric, with a plurality of fibers from the web disrupted therefrom and forced through the web to penetrate the fabric. The web preferably is compressed against the fabric using force sufficient to maintain contact between surfaces of the web and the fabric. Needling is conducted at least substantially regularly over the surface of the contacted web, and preferably with substantially uniform spacing of needles across the width, or cross direction, of the contacted layers and substantial uniformity of machine direction spacing of needle penetrations. Preferably, needling density is about 50 to about 300 ppi for desirable attachment of the web to the fabric without significant disruption of the fused fibers of the web, with 50 to about 200 ppi being most preferred.

Needle penetration through the web and the fabric is at sufficient depth to force fibers of the web to penetrate the fabric. Typically, a plurality of fibers from the web penetrates through the fabric so that they project from the composite surface formed by the fabric. Preferably, the needles penetrate to a depth of about ¼ to about ¾ inch, and most preferably about ½ inch. For purposes hereof, depth of penetration of the needles refers to length of the needles extending beyond the surface of the woven fabric at the peak of the needles stroke into and through the contacted layers of web and fabric. Greater depths can adversely affect web strength and stability in the final composites, while lesser depths may not affix the web to the woven fabric with sufficient strength to retain integrity and stability in use of the composites. At needle densities utilized for forming the composites, needling to these depths typically leaves more than 50% of the weight of the starting web disposed on the web surface of the composite, and preferably about 70 to about 98% of the initial weight so-disposed.

A preferred needling device for forming the composites is a single needleboard with needle density of about 4 to about 12 needles per inch in the cross-machine direction. Throughputs through such a needle loom typically are about 20 to about 100 feet per minute, and preferably about 30 to about 80 feet/minute, with the needleboard operating at about 500 to about 1000 strokes per minute.

Barbed needles are suitably used for needling, with single- and double-barbed needles being preferred for penetration of fabric by fibers from the web with good attachment but without undue disruption of the web or loss of strength and stabilizing effect in the composites. An example of a preferred needle is a single-barbed needle with triangular blade, such as type F-10-1-26-5NK/LI/1B/1E 15×18× 32×3 needle from Foster Needle Company.

A preferred process for making the composites is an in-line process comprising forming an unfused, needlepunched web, fusing fibers of the web at least at a surface thereof, contacting the web with the woven fabric and needling the web in contact with the fabric with the needles first penetrating the web and then the fabric such that a plurality of fibers of the web penetrate the fabric to affix the web to the fabric and stabilize the fabric.

An equipment configuration for making the composites by needling is illustrated in FIG. 2. Closed weave fabric 103 is delivered to line 101 from a feed roll or other source (not shown) over moving belt conveyor 102 into contact with fused web 105 supplied from a web source (not shown) such as a roll or web manufacturing and fusion line. Roller assembly 104 positioned above the moving web compresses the web into contact with a surface of the fabric. The web and fabric are fed in contact into needle loom 106. As they enter the needle loom, the web is disposed atop the fabric. The contacted layers pass between upper and lower guides 108 and 110. The guides are in the form of plates with a plurality of small holes 112 in registry for receiving needles of the needle loom.

Needles 114 of the needle loom are carried by needle board 116, which is driven by reciprocating drive 118 to lower and raise the needles into and out of the contacted web and fabric as they advance through the needle loom. Fibers of the web are carried with the needles during their downstroke through the web and the fabric through the surface of the fabric carried on lower guide plate 110.

After passing through the needle loom, composite 107, with the web and fabric thereof joined by penetration of fibers of the web into the fabric, is pulled from the loom by roll 120 to a suitable takeup or further processing as desired (not shown). Roll speed can be adjusted as appropriate for control of tension on the layers during needling. Generally, slight tension applied in the direction of advancement through needling promotes uniform spacing of needle penetrations in the machine direction.

It will be appreciated that variations of the line and process depicted in FIG. 2 can be employed. For example, rolls for bringing together or compressing the fabric and web layers before they pass into the needle loom can replace one or both of the conveyors illustrated in the figure. Further, although a single needle board is illustrated, multiple needle boards in series can be employed if desired. Other modifications and variations will be apparent to persons skilled in the art.

In another embodiment, the invention provides tufted products, and particularly tufted carpets, with improved stability and uniformity and methods for making such products. Tufted carpets have MDR of at least about 15 pounds and ODR of at least about 2.5 pounds/inch. Tufted goods also have substantial weftline straightness. Bow and skew of weft tapes preferably are less than 0.7% and less than 1.2%, respectively. Pattern-tufted carpets have substantial pattern uniformity without mismatches or distortion. The tufted products comprise a backing tufted with face fibers or yarn such that it penetrates the backing to form a plurality of tufts on one side of the backing and a plurality of stitches on a second side. The backing in such tufted goods comprises a fabric comprising warp and weft tapes woven in a closed weave, and having a coherent web of staple fibers in contact with a surface of the fabric on the second side of the tufted product, without fusion thereto, and a plurality of fibers of the web penetrating the fabric, wherein the fibers have a weight of 1 to about 4 osy, the fibers of the web are oriented in at least two directions and a plurality of the fibers of the web are fused to other fibers of the web. Penetration of fibers of the web into the fabric can occur with a plurality of face yarn penetrations through the backing or, more preferably, both with and separately from the face yarn penetrations.

Figure 3:
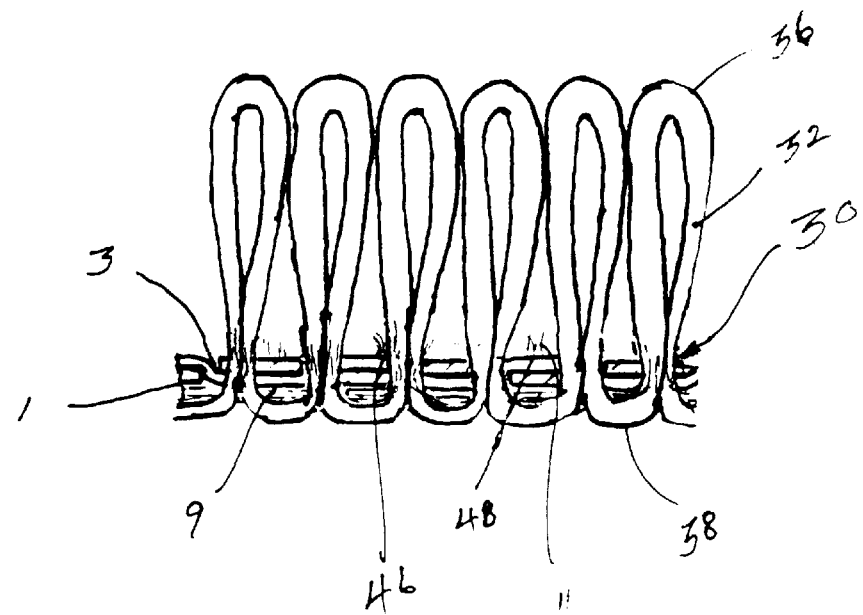

A tufted backing according to a preferred embodiment of the invention is illustrated in FIG. 3. Tufted backing 30 has face yarns 32 penetrating backing 1 such that yarn tufts 36 are disposed on one side of the tufted product and stitches 38 are disposed on an opposite side. Backing 1 comprises closed weave fabric 3 with web 9 affixed thereto on the stitched side of the tufted backing. Fibers 11 from the web are seen penetrating the woven fabric at face yarn penetrations through the backing, as at 46, and separately from the face yarn penetrations as at 48.

Face yarns suitable for the tufted carpets are well known and can be composed of any suitable material. The yarns comprise a plurality of filaments. Preferably, filaments comprise at least one thermoplastic resin; examples include nylon, polyester, polypropylene and acrylic resins. Continuous filament yarns and spun yarns are suitable. Natural fiber yarns, such as those with wool or cotton filaments also can be used. Continuous filament yarns used in carpets are usually bulked to provide texture. Bulking is introduced by various techniques such as crimping, texturing with fluid jets, twisting and detwisting and the like. Twisting, cabling, plying, heatsetting and combinations of such techniques are often used to impart or preserve bulk. Bulked continuous filament yarns are commonly known as "BCF" yarns. Nylon BCF yarns, composed of either nylon 66 or nylon 6, and polypropylene BCF yarns are most commonly used in carpets although nylon spun yarns and polyester yarns also are used. Pigmented, or solution-dyed, yarns prepared by incorporating pigments into resins from which filaments are spun are suitable as are natural color yarns that can be dyed after tufting, for example in a finishing step. Generally, BCF carpet face yarns have deniers of at least about 1200. Deniers up to about 10,000 are common in conventional carpet styles, although in some styles deniers as high as 20,000 and even greater are known. Filament counts of typical face yarns range from about 70 to about 1200, with about 8 to about 30 denier per filament.

The face yarn is tufted into the backing such that the web layer is disposed on the stitched side of the tufted backing. Typically, such a configuration results from tufting so that tufting needles penetrate the web and then into the fabric. Generally, tufting is accomplished by advancing the backing through a tufting device equipped with a plurality of reciprocating tufting needles. Face yarn is stitched into the backing by the reciprocating action of the needles. Yarn tufts can be cut to provide a cut pile surface or can remain uncut to provide a looped pile surface.

Tufted backings and carpets can be provided in styles, weights, tuft densities and pile heights as desired. Examples of carpet styles include Saxony, Berber, velvet, cut-and-loop, cut pile, high-low, and loop pile carpets. Cut pile styles are common for residential applications while loop pile styles are typically used for commercial, hospitality and carpet tile end uses. Pile heights of about ⅜ to about ⅞ inch are common in residential carpets while about 3/16 to about ½ inch are common of commercial carpets. Tuft densities typically range from about 30 to about 200 tufts per square inch for both types of carpets. While these constructions and properties are common for carpets currently used in various applications, it will be evident to those skilled in the art that heavier and lighter weights, longer or shorter piles and greater or lesser tuft densities may be suited for particular end uses and are contemplated according to the invention.

Tufted backings according to this aspect of the invention have improved stability during tufting and finished carpets with such tufted backings have improved uniformity and, particularly, good regularity and matching in patterned carpets. Stitch lock of the tufted products and finished carpets is often improved due to packing of fibers around face yarns where they penetrate the backing.

Tufted carpets according to the invention preferably also include a secondary backing laminated to the tufted backing. Generally, secondary backings comprise a film, a woven, knitted or nonwoven fabric, woven or nonwoven scrims, netlike nonwovens, or composites or combinations thereof. Preferred secondary backings are materials constructed of thermoplastic resins, and particularly polypropylene tapes or yarns. Particularly preferred secondary backings are conventional polypropylene secondary backings, which are typically open weave fabrics woven from polypropylene tapes, or from tapes in one direction and polypropylene filament or spun yarns in the other. Plain weave and leno constructions are preferred. Most preferred secondary backings are fabrics comprising polypropylene tapes, and especially with tapes in the warp and polypropylene spun or multifilament weft yarns, in a plain or leno weave construction with about 10 to about 24 warp tapes per inch and about 4 to about 14 weft tapes or yarns per inch. Such secondary backings having a light weight layer of staple fibers or staple fiber nonwoven needled or otherwise affixed to a surface of the fabric also can be useful. Preferably, fiber lengths in such a layer are about 2 to about 4 inches and fiber weights are about 1.5 to about 2.5 osy. Specific examples of woven secondary backings are ActionBac® Fabrics available from Amoco.

Carpets according to the invention are finished by steps comprising one of more of dyeing, application of binder to secure face yarn stitches to the tufted backing, and lamination of a secondary backing, if used. Finishing steps are well known. Binders typically comprise aqueous latex compositions that can be applied in liquid form to the stitched surface of the tufted backing and then heated to remove liquid contents and cure the binder. Latex formulations used in carpet manufacture are commonly particulate-filled, aqueous latexes of organic polymer compositions that cure on heating. Crosslinkable styrene-butadiene copolymers are most commonly used as the organic polymer of the backcoat formulations. The particulate filler commonly is calcium carbonate and typically is present in latexes in significant amounts (e.g., 60–85 wt %) to impart viscosities enabling application of backcoats with simple liquid coating equipment. Alternatively, thermoplastic binders are used to bind the stitches or stitches and secondary backing by melting a thermoplastic resin with lower softening or melting point than other carpet components in contact with the tufted backing or tufted backing in contact with a secondary backing and then cooling to solidify the resin. Thermoplastic resins also can be applied to tufted backings in melted form and then cooled in contact therewith, and in contact with a secondary backing if used, to solidify the resin and bind the carpet structure.

The following examples illustrate the invention but are not to be considered to limit its scope. Test procedures used in the examples were ASTM D-4595 for tensile strength measurements, ASTM D-737 at differential pressure equal to 0.5 inch of water for air permeability measurements, procedures according to Adanur, noted above, for bow and skew, and MDR and ODR tests described below.

For MDR testing, 8-inch by 8-inch samples with lengths and widths aligned with the machine and cross directions were cut. Samples were mounted in the grips of a tensile testing machine, with their tops held in an 8-inch wide grip and bottoms held in the middle of the samples in a 1-inch grip. The samples had gauge lengths of 4 inches and were pulled in the testing machine under tension increasing at 0.4 inch/minute. Force at 5% elongation, corresponding to 0.2 inch, was measured and is reported in pounds.

For ODR tests, 4-inch by 8-inch specimens were cut at a 45° angle to the warp and placed in the testing machine. Specimen configuration in the testing machine was such that no tape of a woven fabric, whether present as such or in a composite or tufted composite, was held by more than one grip of the machine. The specimen was gripped across its full width with a 4-inch gauge length and pulled under tension increasing at 0.4 inch/minute. The force at elongation of 5% was measured, converted to force per unit width and is reported in pounds/inch.

EXAMPLE 1

In this example, a composite primary backing was prepared from a coherent staple fiber web with fused fibers and a woven tape primary backing fabric.

The web was a surface-fused, needlepunched web composed of 4 denier polypropylene staple fibers with average length of 4½ inches. Fibers in the web were oriented in different directions as a result of carding to align fibers primarily with the axis of the card and then crosslapping the carded webs. The crosslapped webs were tacked by needling at 171 ppi and the tacked web was drafted in the machine direction, needled at 251 ppi, drafted in the cross direction and fibers at both surfaces were fused by hot roll fusion using rolls heated at about 182° C. The web weighed 2.5 osy and had MDR of 22.5 pounds and ODR of 5.5 pounds/inch.

The woven fabric was a commercial primary backing fabric, identified as PolyBac® Fabric Style 2816 from Amoco, with a 24×18, plain weave construction of polypropylene warp and weft tapes, with coverages of about 120% in the warp and about 170% in the weft. The tapes were contoured with small longitudinal ridges. The fabric weighed 4 osy and had air permeability of about 17 CFM/ft$^2$, MDR of 30 pounds and ODR of 2.5 pounds/inch. The weft line of the fabric was substantially straight. Bow was 0.3% and skew was 0.1%.

The composite backing was prepared by feeding the web and the fabric in contact into a 200-inch wide needleloom from Dilo Machinenfabrik equipped with two downstroke needleboards with type F-10-1-26-5NK/LI/1B/1E 15×18× 32×3 needles from Foster Needle Co. The fabric and the web were introduced to the needleloom so that the needles penetrated the web before the fabric. The contacted web and fabric were needled to a depth of one-half inch at a needling density of 90 ppi to attach the web to the fabric.

The composite weighed 6.5 osy. It had weft line bow of 0.05% near its center, no noticeable skew or blips, machine and cross direction tensile strengths of 92 pounds/inch and 113 pounds/inch, respectively, air permeability of 20 CFM/ft$^2$, MDR of 44 pounds and ODR of 4.9 pounds/inch.

For comparison, a 6.5 osy, a commercial FLW primary backing with a woven fabric as in Example 1 and 2.5 osy of 2 inch, 4.5 denier staple fibers affixed by needling about half of it at 400 ppi and then needling the remainder at 400 ppi, had MDR of 26 pounds and ODR of 2.6 pounds/inch.

EXAMPLE 2

A 30-inch wide sample of the composite made in Example 1 was wound onto a roll that was installed on the feed side of a 3 ft wide tufting machine, made by Cobble Tufting Machine Co., fitted with an 18-inch wide needlebar. The composite with its web surface facing upward was fed to the tufter and was tufted, web side first, in a ⅒ guage pattern at 10 stitches per inch with 180 ends of 72 filament, 1425 denier polypropylene BCF yarn and cut to produce a cut pile face that weighed about 14 osy.

The resulting tufted backing had no noticeable bow, skew or other deviations from weftline straightness. Warp and cross direction tensile strengths were 95 pounds/inch and 88 pounds/inch, respectively, MDR was 29 pounds and ODR was 3.7 pounds/inch.

For comparison, the woven primary backing used to make the composite in Example 1 and the FLW comparator were each tufted as in Example 2. The tufted woven backing had machine direction tensile strength of 83 pounds/inch, cross direction tensile strength of 87 pounds/inch, MDR of 26 pounds and ODR of 1.9 pounds/inch. The tufted FLW backing had MDR of 21 pounds and ODR of 1.8 pounds/inch.

EXAMPLE 3

Composite backings were made substantially as in Example 1 except that the woven fabric was a commercial, 24×15 plain weave polypropylene tape primary backing fabric, identified as PolyBac® Fabric Style 2261, and needling densities were varied. Samples of the fabric, designated W, and composites, designated A–D, were tufted as in Example 2 and tested for ODR with the following results:

| Sample: | A | B | C | D | W |
|---|---|---|---|---|---|
| Needling Density (ppi): | 100 | 200 | 300 | 400 | — |
| ODR (lbs/inch): | 3.4 | 3.2 | 2.9 | 2.5 | 1.3 |

These data demonstrate that off-axis stabilities of the composites decreased as needling density increased but were still superior to that of the woven fabric.

We claim:

1. A tuftable backing composite comprising a tuftable, closed-weave fabric comprising warp and weft tapes and having a coherent nonwoven web of staple fibers in contact with one surface of the fabric without fusion thereto and a plurality of fibers from the web penetrating the fabric to attach the web to the fabric, wherein the fibers have a weight of 1 to about 4 osy, the fibers of the web are oriented in at least two directions and a plurality but not all of the fibers of the web are fused, and wherein weft tapes of the composite have weftline straightness suitable for patterned tufting and the composite has stability against deformation during tufting as indicated by MDR of at least about 20 pounds and ODR of at least about 4 pounds/inch.

2. The composite of claim 1 wherein fibers are present on an opposite surface of the fabric.

3. The composite of claim 1 wherein the tapes comprise polypropylene.

4. The composite of claim 3 wherein the fabric has a latch cord selvage.

5. The composite of claim 1 wherein the fibers comprise polypropylene.

6. The composite of claim 5 wherein the tapes comprise polypropylene.

7. The composite of claim 6 wherein the weft tapes have bow less than about 0.7% and skew less than about 1.2%.

8. The composite of claim 1 further comprising face fibers tufted into the composite.

9. A tufted product comprising a backing having face yarn penetrating therethrough to form a plurality of tufts on a face side and a plurality of stitches on a stitched side, wherein the backing comprises a closed-weave fabric comprising warp and weft tapes and a coherent nonwoven web of staple fibers on the stitched side and in contact with a surface of the fabric without fusion thereto and a plurality of fibers from the web penetrating the fabric, wherein the fibers have a weight of 1 to about 4 osy, the fibers in the web are oriented in at least two directions and a plurality but not all of the fibers in the web are fused, and wherein the tufted product has MDR of at least about 15 pounds and ODR of at least about 2.5 pounds/inch.

10. The tufted product of claim 9 wherein the tapes of the fabric comprise polypropylene.

11. The tufted product of claim 9 wherein the fibers of the nonwoven web comprise polypropylene fibers.

12. The tufted product of claim 9 wherein the weft tapes have bow less than about 0.7% and skew less than about 1.2%.

13. The tufted product of claim 12 wherein the face yarn is tufted in a pattern.

14. The tufted product of claim 13 comprising a secondary backing adhered to the tufted backing on the stitched side.

15. The tufted product of claim 9 comprising a secondary backing adhered to the tufted backing on the stitched side.

16. The tufted product of claim 15 wherein the secondary backing comprises an open weave woven fabric.

17. The tufted product of claim 15 wherein the secondary backing comprises an open weave fabric needled with staple fibers or a nonwoven fabric.

18. The tufted product of claim 15 wherein the open weave fabric comprises a leno weave fabric.

19. A method for making a tuftable backing comprising needling to a tuftable, closed-weave fabric comprising warp and weft tapes a coherent nonwoven web comprising staple fibers oriented in at least two directions and a plurality but not all of which are fused, wherein the web has a weight of 1 to about 4 osy and ODR of at least about 2.5 pounds/inch and the needling is effective to affix the web to the fabric and stabilize the fabric.

20. The method of claim 19 wherein the fabric and the web are needled at about 50 to about 400 ppi.

21. The method of claim 20 wherein the fibers of the web comprise polypropylene fibers and the tapes comprise polypropylene.

22. The method of claim 21 wherein the fibers of the web are fused at least at a surface of the web.

23. The method of claim 21 wherein at least one of bow and skew of the weft tapes of the fabric is greater than that of the weft tapes of the composite.

24. A method for making a tufted product that comprises tufting face yarn into a first side of a tuftable backing composite comprising a tuftable, closed-weave fabric comprising warp and weft tapes and having a coherent nonwoven web of staple fibers in contact with a surface of the fabric on the first side, without fusion thereto, and a plurality of fibers from the web penetrating the fabric to attach the web to the fabric, wherein the fibers have a weight of 1 to about 4 osy, the fibers in the web are oriented in at least two directions and a plurality but not all of the fibers in the web are fused, and wherein the weft tapes of the composite have weftline straightness suitable for patterned tufting and the composite has stability against deformation during tufting as indicated by MDR of at least 20 pounds and ODR of at least about 4 pounds/inch.

25. The method of claim 24 wherein the backing has a weight of about 3 to about 8 osy.

26. The method of claim 24 wherein the tapes of the fabric comprise polypropylene.

27. The method of claim 26 wherein the fibers of the nonwoven web comprise polypropylene fibers.

28. The method of claim 24 wherein the face yarn is tufted into the backing in a pattern.

29. The method of claim 24 comprising adhering a secondary backing to the stitched side of the tufted product.

30. The method of claim 29 wherein the secondary backing comprises an open weave fabric.

* * * * *